UNITED STATES PATENT OFFICE.

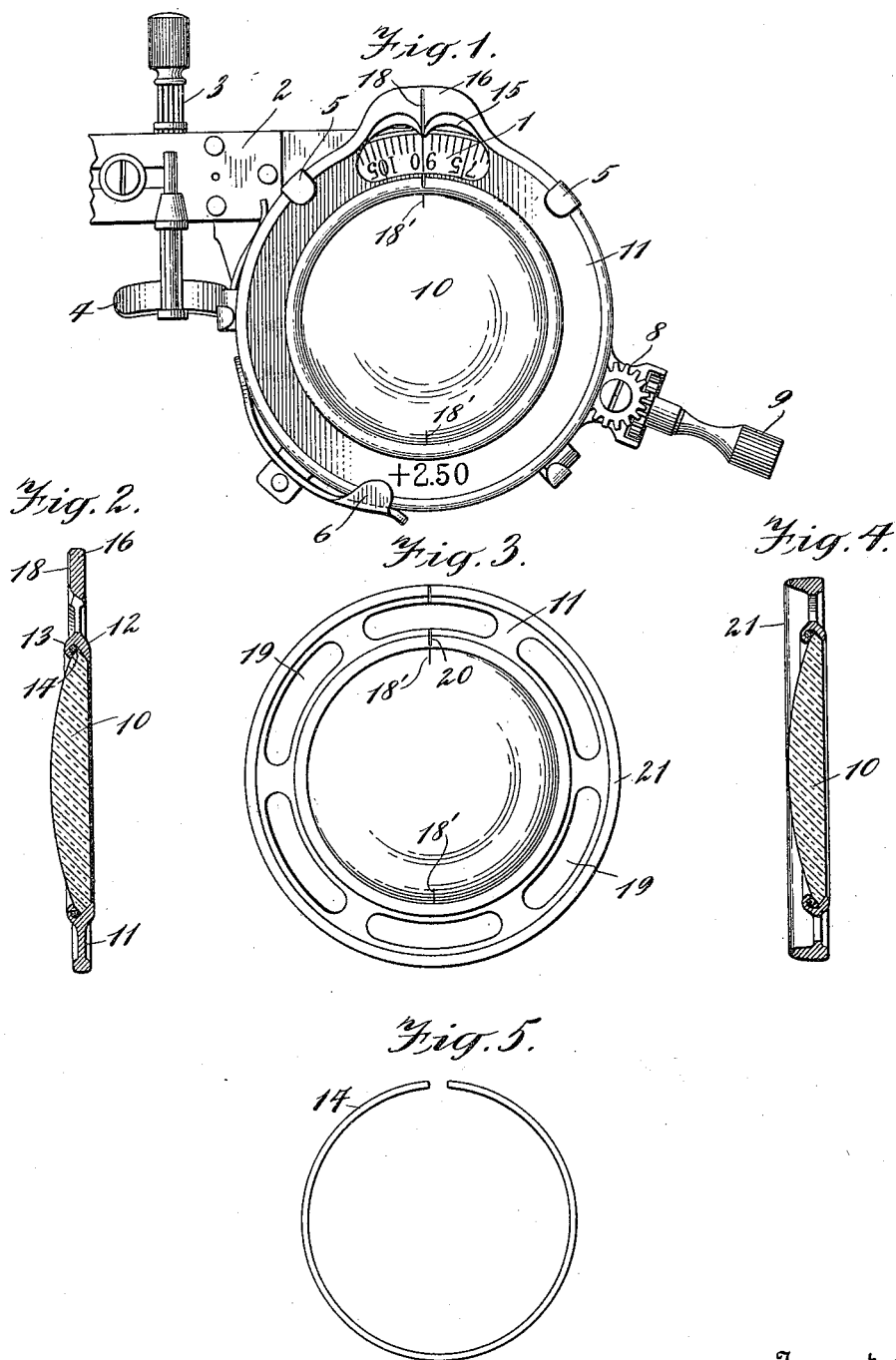

EMIL B. MEYROWITZ, OF NEW YORK, N. Y., ASSIGNOR TO GENERAL OPTICAL COMPANY, INC., A CORPORATION OF NEW YORK.

TEST OR TRIAL LENS.

1,148,608.  Specification of Letters Patent.  Patented Aug. 3, 1915.

Application filed July 10, 1914. Serial No. 850,079.

*To all whom it may concern:*

Be it known that I, EMIL B. MEYROWITZ, a citizen of the United States, residing at the city of New York, in the borough of Manhattan and State of New York, have invented certain new and useful Improvements in Test or Trial Lenses, of which the following is a full, clear, and exact description.

This invention relates to test or trial lenses, various combinations of which are adapted to be used in a trial frame to determine the character and the strength of the lens required to correct the defective vision of the patient.

Heretofore practically all the test lenses have been made one and one-half inches in diameter, following a standard size adopted by the oculists for many years. However, since the thickness of the lens is proportional to its diameter, as well as to its power, it has been found that lenses of this standard size are open to several serious objections, besides their weight, which is materially greater than the finished lenses which will be thereafter worn. Imperfect neutralization is one of these, for it has been found that when a double convex lens of a high power is combined with a lens of an equal negative power, the two lenses will not neutralize each other but that there will be an error in neutralization which is frequently as great as one diopter. To overcome this error, the double convex of the higher powers have been ground so that their nominal power is slightly greater than their true power, while the concave lenses are ground to their true powers and in this manner an approximate neutralization is obtained. It is, however, impossible to standardize the various lenses of a trial set, ground in this fashion, since there will always be an error corresponding to the error in the vision of the person determining the increase in power which must be given to the convex lenses in order to obtain the approximate neutralization. Peripheral aberrations is another of the objections. This occurs in the outer annular portion of large lenses of high powers when combined together. Difficulty in centering the lenses relative to the line of vision of the patient is another objection and this is caused chiefly by the large size of the standard lenses at present used. This objection is more pronounced where it is essential that the axis of a lens be adjusted relative to the eye of the patient as with lenses of cylindrical powers which are used to correct astigmatism and similar diseases of the eye.

Since in conducting the test upon the eye of a patient only a small central portion of the lens is used, it is therefore proposed to reduce materially the diameter of the test lens so that it will not be more than one inch or even less than that in diameter. This reduction in diameter not only decreases the thickness and hence the weight of the lenses, which, in itself, is an advantage, but gives rise to several other distinct advantages while the accuracy with which the tests may be conducted is in no wise diminished. One of the principal resulting advantages is that both the convex lenses and concave lenses can be ground exactly to conform to their true powers, and the grinding of convex lenses so that their nominal powers will be greater than their true powers unnecessary. The error in neutralization which heretofore depended upon the determination of an approximate neutralization by the human vision of the person determining the normal powers of the convex lenses, is entirely eliminated. All test lenses may, therefore, be ground to a mechanical standard, the lenses of one trial set corresponding exactly with the lenses of another. The decrease in diameter of the lenses also permits the lens to be more accurately centered, when in the trial frame, relative to the line of vision of the patient and the axis of the lens correctly positioned to correct for astigmatism and the like. Lens aberrations will also disappear, since the thickness of the lens is reduced to such an extent that it will be practically negligible.

Another important advantage resulting indirectly from the decreasing of the diameter of the trial lenses, is that each of the lenses, even the convex lenses of the higher powers, may be made plano on one side, which permits a combination of the lenses to be placed in the trial frame with their plano surfaces adjacent each other, which will give for all practical purposes a combination of lenses which is the exact equivalent of the finished lens which will thereafter be worn.

As practically all of the trial frames at present constructed are adapted to receive the test lenses of an inch and one half in diameter, it is desirable that lenses of much less diameter should be so mounted that they will be also adapted to be used with the usual form of trial frame, and the primary object of this invention is to provide such a mount which is accomplished by the provision of a broad annular rim in which the lens is secured and whose outside diameter corresponds to the diameter of the test lenses of the present standard. It is also desirable in test lenses and particularly those which have a fixed determined axis, that when the same is rotated in the trial frame to the correct position relative to the eye of the patient, that the oculist or optician will be able to readily determine the meridial plane in which the axis of the lens is located.

Another object of this invention is therefore to provide in the mount or test lens a window or opening which has a correctly positioned pointer adjacent thereto by which the axis of the lens may be determined by means of a graduated scale carried on the annular eye-piece of the frame. If desired, a plurality of such openings may be made in the annular face of the lens mount which will materially lighten the same.

Still another object of the invention is to provide means for securing the lens in the mount as it is proposed to construct the broad annular rim of a single integral piece into which the lens is placed and some means is therefore necessary to prevent the lens from rotarial and lateral displacement.

A still further object of the invention is to provide a mount which will protect the surface of the lens from scratching, either while in the trial case or while being placed or removed from the trial frame.

With these and other objects in view, my invention consists of the construction and combinations which will be hereinafter set forth and particularly pointed out in the claims.

In the accompanying drawings, Figure 1 is a front elevation of one form of my improved mount for a test lens showing associated therewith a portion of the trial frame; Fig. 2 is a cross-section of the lens and mount therefor as shown in Fig. 1; Fig. 3 is a front elevation of a modified form of mount for the lens; Fig. 4 is a cross section of Fig. 3; and Fig. 5 is a detail of the resilient split ring used to secure the lens against rotarial displacement.

The form of trial frame which is particularly disclosed in Fig. 1, forms no part of the present invention and will therefore be only briefly described.

1 designates one of the annular eye-pieces of the trial frame which is connected to the bridge piece 2 by a rack and pinion connection, the pinion alone of which is shown and designated 3, whereby the eye-piece 1 may be adjusted to conform to the interpupilary distance of the eyes of the patient. The surface of this annular rim or eye-piece is graduated in degrees in the usual manner. Rotatably mounted beneath the eye-piece 1 is a second annular rim or ring which carries stationary clips 5 and a spring-pressed clip 6 which extend above and over the graduated eye-piece and are adapted to engage the test lens and to hold it against rotarial displacement relative to this annular ring which is adapted to be rotated by the gearing 8 by means of the handle piece 9.

In the form of mount for the test lens of reduced diameter shown in Figs. 1 and 2, 10 designates broadly the lens and 11 the broad annular rim in which the same is mounted. The lens is shown as a plano convex lens of one of the higher powers, but it is to be understood that a similar mount is used with all of the lenses of various characters and powers which are used in making up a trial set. The annular rim is preferably made in a single integral strip and is constructed of aluminum or other like metal having an outer diameter of one and one half inches which corresponds to the diameter of the standard test lens at present used and which adapts it to be used with the common form of trial frames. The inner periphery of the rim 11 is provided with two diverging lips 12 and 13 which form a substantially V-shaped groove into which the beveled peripheral edges of the lens fit. Before the lens is secured in place, the lip 13 is spread outwardly sufficient to permit the lens to be positioned into place against the lip 12. Interposed between the lip 13 and the other beveled surface of the lens is a thin split spring ring 14 which is constructed so that it will exert its tension outwardly and will therefore, when positioned between the lip 13 and the peripheral beveled edge of the lens, exert its tension to hold the lens securely against the sides of the V-shaped groove formed by the lips 12 and 13 and therefore prevent rotarial displacement of the lens. The outer portion of the lip 13 is then swaged and burnished down over the lens in the usual manner. It will be seen that the construction described is an extremely simple one in which a non-split mount is used for the lens, and the lens is, by the use of the spring ring 14, prevented from rotarial displacement.

When a test lens of the character just described is positioned in a trial frame by means of the clips 5 and spring-pressed clip 6, the broad annular rim entirely covers the graduations on the rim 1 of the trial frame so that in order to determine the exact position of the axis of the lens a window or elongated sight opening 15 is cut in the annular surface of the rim 10, the sides of which opening are preferably on the arcs of a circle concentric to the axis of the mount. The outer peripheral portion of the rim opposite the sight opening 15 is preferably bulged outwardly as at 16, which, together with the walls of the opening, forms a handle by which the test lens may be held. As will be apparent from Fig. 1 of the drawing, the outer edge of the handle extends only a short distance beyond the peripheral edge of the mount so that upon rotation of the lens, the same is not liable to strike against the nose of the person wearing the trial frame, yet by providing the bulge in the mount adjacent the sight opening, the walls of the latter help to form a handle of sufficient size to permit a person handling the lens to obtain a firm hold of it when placing it in or removing it from the trial frame. A radially disposed mark 18 leading to the sight opening or window serves as a pointer to indicate the position of the axis 18' of the lens so that upon rotation of the same the meridian of the axis may be readily determined by the coöperation of this pointer with the graduated scale carried by the eye-piece 1.

In the modified form of mount shown in Figs. 3 and 4, a plurality of windows or openings 19 are cut in the broad annular rim 10, one of which is provided with a pointer 20 similar to that disclosed in the form shown in Figs. 1 and 2, the other openings being provided in order to materially reduce the weight of the combined test lens and mount, which it is essential to reduce to a minimum in order that when various combinations of the test lenses are placed in the trial frame, the same will not be burdensome to the patient wearing the trial frame. In this form the peripheral edge of the mount is shown with a laterally-extending flange 21, the outer edge of which projects slightly beyond the concave surface of the test lens and which will therefore protect the same against scratching should the same be laid upon a rough surface or carelessly used. This flange will also serve as a means to permit the oculist to obtain a firm hold upon the mount without touching the lens and thereby soiling the same.

I claim:—

1. The combination with a trial lens, of a mount therefor, comprising a relatively broad annular rim having a sight opening in its annular face.

2. The combination with a test lens of a mount therefor, said mount comprising a relatively broad rim having a sight opening in its annular face, and a pointer adjacent said sight opening.

3. The combination with a test lens of a mount therefor comprising a relatively broad non-split annular rim having integral lips projecting from its inner periphery engaging with the peripheral edge of the lens, and means interposed between one of said lips and the edge of the lens for preventing rotarial displacement of the lens.

4. The combination with a test lens of a mount therefor comprising a relatively broad non-split annular rim having integral lips projecting from its inner periphery and a resilient ring interposed between one of said lips and the lens to prevent rotarial displacement of the latter.

5. The combination with a trial lens of a mount therefor, comprising a relatively broad annular rim having a sight opening therein, said rim having a portion thereof extending slightly beyond the peripheral edge of the same and forming with the walls of said sight opening a handle for the mount.

In witness whereof I subscribe my signature, in the presence of two witnesses.

EMIL B. MEYROWITZ.

Witnesses:
  WALDO M. CHAPIN,
  JULE ZELENKO.

Copies of this patent may be obtained for five cents each, by addressing the "Commissioner of Patents, Washington, D. C."